United States Patent [19]
Fujita et al.

[11] Patent Number: 5,599,043
[45] Date of Patent: Feb. 4, 1997

[54] IMPACT ENERGY ABSORBER

[75] Inventors: Yoshiyuki Fujita, Nagoya; Kouichi Kaga, Ama-gun; Sadao Uchida, Ichinomiya; Norio Umemura, Nagoya; Atsushi Nagata, Inazawa, all of Japan

[73] Assignee: Toyoda Gosei Co., Ltd., Aichi-ken, Japan

[21] Appl. No.: 546,309

[22] Filed: Oct. 20, 1995

[30] Foreign Application Priority Data

Oct. 25, 1994 [JP] Japan .................................. 6-259956
Mar. 30, 1995 [JP] Japan .................................. 7-073607

[51] Int. Cl.$^6$ ............................................. B60R 21/05
[52] U.S. Cl. ................................. 280/750; 280/732
[58] Field of Search ........................... 280/750, 732, 280/751, 752

[56] References Cited

U.S. PATENT DOCUMENTS

| | | | |
|---|---|---|---|
| 3,172,683 | 3/1965 | D'Antini | 280/750 |
| 3,992,041 | 11/1976 | Vernocchi | 280/750 |
| 4,200,309 | 4/1980 | Korn et al. | 280/750 |
| 4,660,852 | 4/1987 | Katayama et al. | 280/750 |

FOREIGN PATENT DOCUMENTS

4-166449  6/1992  Japan .

*Primary Examiner*—Kenneth R. Rice
*Attorney, Agent, or Firm*—Cushman Darby & Cushman IP Group of Pillsbury Madison & Sutro, LLP

[57] ABSTRACT

An impact energy absorber includes: an interaction member and a plurality of energy absorbing members disposed radially around the interaction member, each of the energy absorbing members having a contact portion disposed on the interaction member side for being contactable with the interaction member, a ceiling portion disposed in the radially outside of the interaction member for receiving an impact force, and a shrinkable portion disposed between the contact portion and the ceiling portion so that the shrinkable portion is plastically deformable so as to shrink in the radial direction of the interaction member. The impact energy absorber can make the quantity of absorbed energy constant even if the acting angle of an impact force varies, so that it is possible to improve the degrees of freedom of the installation for the impact energy absorber.

10 Claims, 9 Drawing Sheets

IMPACT ENERGY ABSORBER

BACKGROUND OF THE INVENTION

The present invention relates to an impact energy absorber provided on a steering wheel or on an instrument panel in a vehicle. The impact energy absorber according to the present invention is plastically deformed by an impact force, so that the energy of the impact force is thereby absorbed. Particularly, the present invention relates to an impact energy absorber which can absorb a constant quantity of impact energy even if the incident angle of the impact force thereon varies.

A conventional impact energy absorber provided on a steering wheel has a square, sheet metal pillar section, for example, as disclosed in Unexamined Japanese Patent Publication No. Hei. 4-166449. However, if the incident angle of the impact force varies so that the impact force acts on an edge portion of the square pillar and, therefore, through a corner thereof, the plastic deformation behavior of the impact energy absorber can vary. Therefore, the quantity of impact energy absorbed can also vary in the impact energy absorber. It has been therefore necessary to design the impact energy absorber in accordance with the steering wheel structure on which the impact energy absorber is disposed. Accordingly, the provision of the impact energy absorber has a small degree of design freedom.

SUMMARY OF THE INVENTION

The present invention is intended to address the above-identified conventional problems. The present invention provides an impact energy absorber which can absorb a constant quantity of impact energy even if the incident angle of the impact force varies, so that it is possible to increase the freedom of design of the impact absorber.

According to one aspect of the present invention, the impact energy absorber includes an interaction member and a plurality of energy absorbing members disposed radially around the interaction member, each of the energy absorbing members having a contact portion disposed on the interaction member side thereof which can contact the interaction member. A ceiling portion is disposed in the radial periphery of the interaction member for receiving an impact force. A shrinkable or collapsible portion is disposed between the contact portion and the ceiling portion so that the shrinkable portion is plastically deformable in the radial direction of the interaction member.

Preferably, the shrinkable portion of each energy absorbing member is at least one hollow pillar having a polygonal cross-section. The respective shrinkable-portions of the energy absorbing members can also be tongue pieces which are shifted about a circumferential direction of the interaction member and sequentially coupled with each other. More preferably, the respective shrinkable portions are bent pieces having bent portions, which may be, for example, substantially L-shaped in section and disposed around the interaction member in the same direction.

Preferably, the ceiling portions of adjacent energy absorbing members are coupled to each other through a breakable breaking-preset portion. In this case, preferably, the shrinkable portion of each energy absorbing member is disposed on an end portion of the ceiling portion.

In an impact energy absorber according to the present invention, an energy absorbing member corresponding to the incident angle of an impact force receives the impact force at its ceiling portion so as to collapse towards the interaction member side, thereby pressing its contact portion against the interaction member. As a result, the shrinkable portion of the energy absorbing member collapses to thereby absorb the energy of the impact force.

In the impact energy absorber according to the present invention, therefore, only one energy absorbing member corresponding to the incident angle of an impact force absorbs the impact force. Therefore, if the arrangement of the energy absorbing members, which are disposed radially around the interaction member, is carefully considered, it is possible to absorb an impact force by plastically deforming only one energy absorbing member, even if the incident angle of the impact force varies. Accordingly, it is possible to absorb a constant quantity of impact energy absorption. It is also possible to improve the design freedom of the impact energy absorber.

A shrinkable portion of each energy absorbing member may be one or more polygonal pillars. It also may be a tongue piece, whereby respective tongue pieces are shifted about a circumferential direction of the interaction member and coupled with each other sequentially in the radial direction of the interaction member.

Further, the shrinkable portions may be bent pieces having substantially L-shaped bent portions, and are disposed around the interaction member in the same direction. Furthermore, when a shrinkable portion collapses in the radial direction of the interaction member, the bent portion of the bent piece of the shrinkable portion is further bent until it breaks. Adjacent bent pieces are oriented in the same direction so that the bent portion thus bent is disposed in a concave side of an adjacent bent portion because the adjacent bent portions are disposed in the same direction. Accordingly, it is possible to restrain interaction between the shrinkable portions. It is also possible to restrain the deformation load from increasing under the action of an impact force.

Further, when the ceiling portions of adjacent energy absorbing members are coupled by a breakable breaking-preset portion, the energy absorbing members can be structurally integrated. Arranging the energy absorbing members around the interaction member can be done at the same time, thereby facilitating assembling.

When the ceiling portions of adjacent energy absorbing members are coupled with each other by a breakable breaking-preset portion, and the shrinkable portions of the respective absorbing portions are disposed on the end portions of the ceiling portions, it is possible to make energy absorption capacity constant even if the incident angle of an impact force against the ceiling portion of the energy absorbing member varies. It is therefore possible to increase the degrees of freedom for disposition of the impact energy absorber.

That is, when the shrinkable portions of the energy absorbing members are disposed at the respective centers of the ceiling portions, an impact force acting on the center of any ceiling portion strictly bends the ceiling portion so as to break breaking-preset portions on opposite sides of the ceiling portion. Therefore, one shrinkable portion collapses. On the other hand, if an impact force acts on a breaking-preset portion at or near an end portion of a ceiling portion, only the one breaking-preset portion is broken. This bends the respective tops of the ceiling portions on opposite sides of breaking-present portion, making it difficult to deform the shrinkable portions of the respective energy absorbing members on the opposite sides thereof. Therefore, the value of deformation load of the impact energy absorber is large when an impact force acts on the center of any ceiling portion, while the value of deformation load is small when an impact force acts on a breaking-preset portion. Accordingly, the value of deformation load is scattering slightly though it is smaller than that of a conventional impact energy absorber made of a sheet metal.

On the other hand, when the shrinkable portions of the respective energy absorbing members are disposed on the end portions of the ceiling portions, (i.e., near the breaking-preset portions), only one ceiling portion bends so as to break the breaking-preset portions on the opposite sides of the ceiling portion when an impact force acts on the center of the ceiling portion. However, it is difficult for its shrinkable portion to deform because it is coupled with the end portion of the ceiling portion. That is, the value of deformation load is large in the ceiling portion, while small in the shrinkable portion. On the other hand, if an impact force acts on a breaking-preset portion formed at an end of a ceiling portion, one breaking-preset portion is broken, and one shrinkable portion near the breaking-preset portion collapses smoothly. That is, the value of deformation load is small in the ceiling portion, while large in the shrinkable portion. Accordingly, even if an impact force acts at different positions on the center of a ceiling portion and a breaking-preset portion at the end of the ceiling portion, the values of deformation load in the ceiling portion and the shrinkable portion are inversely proportional to each other. It is therefore possible to make the sum of the deformation load in the ceiling portion and the shrinkable portion approximately constant.

Therefore, even if the position at which an impact force acts on a ceiling portion varies between the energy absorbing members, it is possible to make the value of deformation load uniform, and it is possible to make the energy absorption capacity constant. It is therefore possible to further improve the degrees of freedom of the disposition for the impact energy absorber.

DETAILED DESCRIPTION OF THE PREFERRED EMBODIMENTS

Embodiments of the present invention will be described below with reference to the accompanying drawings.

Figure 1:
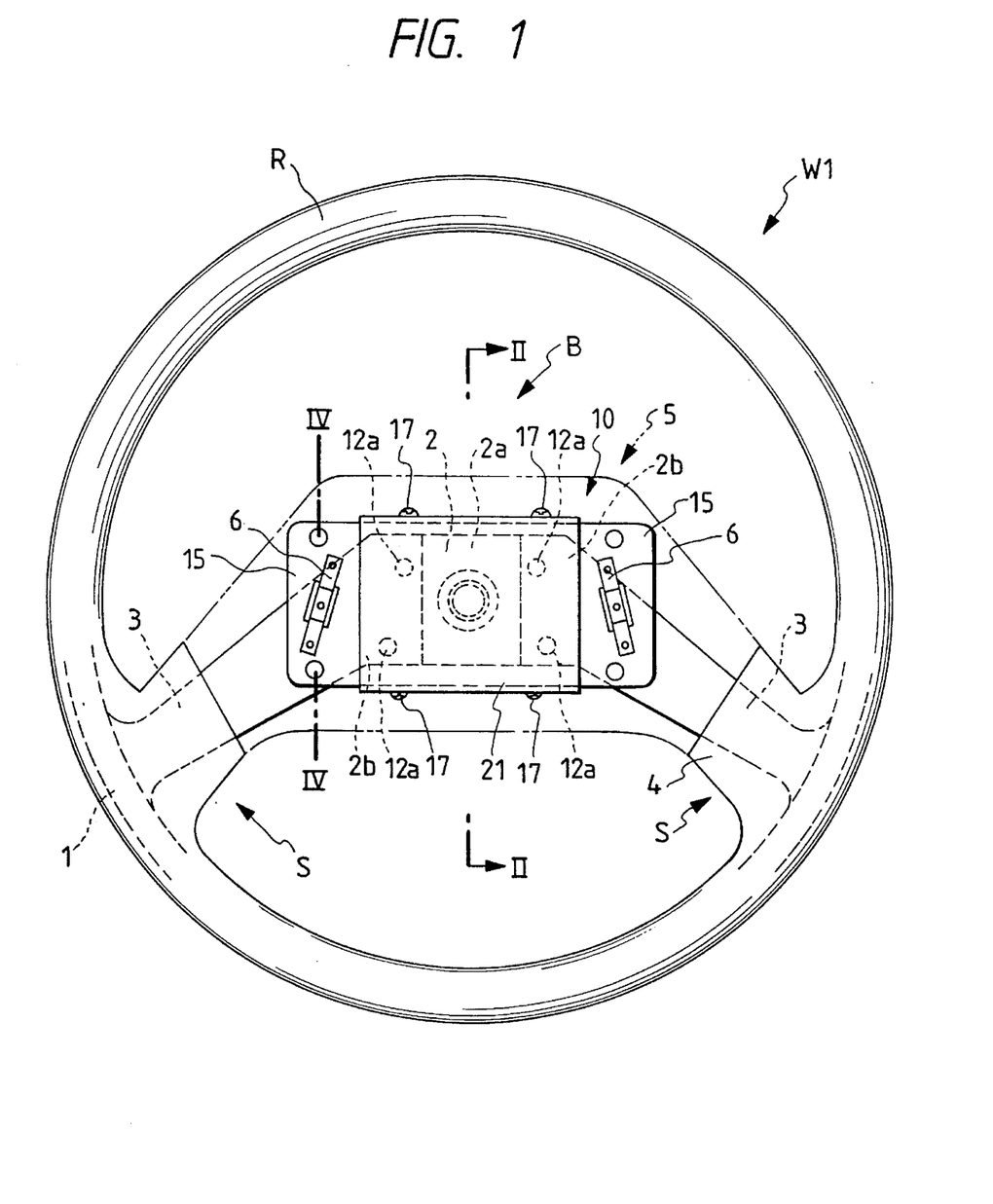
FIG. 1 is a plan view of a steering wheel to which a first embodiment of the present invention is applied.
Figure 2:
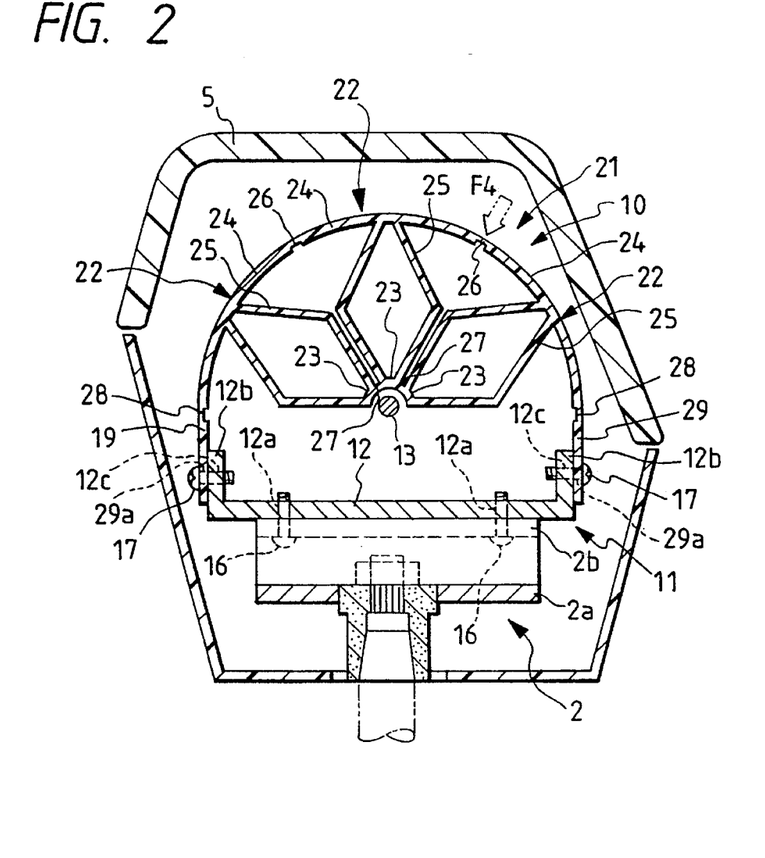
FIG. 2 is a sectional view of the steering wheel taken along line II—II in FIG. 1.

An impact energy absorber 10 of a first embodiment is disposed on a steering wheel W1 of a vehicle, as shown in FIGS. 1 and 2. The steering wheel W1 has of an annular ring portion R, a boss portion B disposed at the center of the ring portion R, and two spoke portions S connecting the boss portion B and the ring portion R. Inside the respective portions, core metal portions 1, 2 and 3 are coupled with each other. Core metal portion 1 of the ring portion R and the core metal portions 3 of the spoke portions S are coated with coating layers 4, respectively. The impact energy absorber 10 is disposed between the core metal portion 2 of the boss portion B and a pad 5 disposed over the core metal portion 2.

Figure 3:
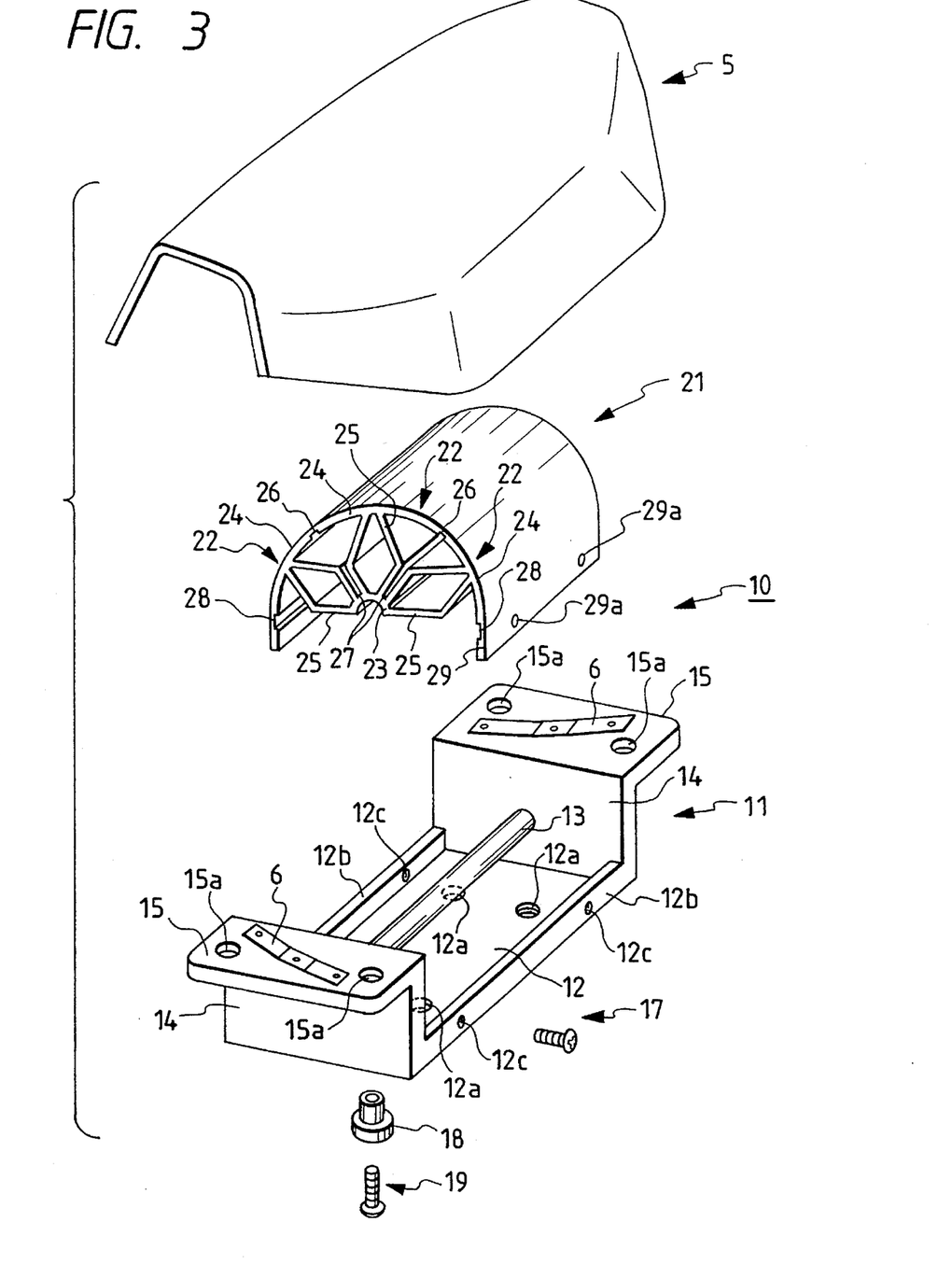
FIG. 3 is an exploded perspective view of the first embodiment.

The impact energy absorber 10 has a base portion 11 fixed to step portions 2b and 2b rising on the sides of boss plate portion 2a in the core metal portion 2 respectively, and an assembly 21 fixed to the base portion 11 and formed from, for example, three energy absorbing members 22.

As shown in FIGS. 2 and 3, the base portion 11 is made from sheet metal, and has of a bottom wall portion 12, side wall portions 14 and 14 extending up from the sides of the bottom wall portion 12 respectively, and upper wall portions 15 and 15 extending laterally outward from the upper ends of the side wall portions 14 and 14 respectively.

In the bottom wall portion 12, four fitting holes 12a for fixing the base portion 11 to the step portions 2b and 2b by, for example, screws 16 are formed in a vertical orientation. The inner circumferential surfaces of the fitting holes 12a are threaded to correspond with the screws 16. Further, vertical wall portions 12b are formed at opposing edges of the bottom wall portion 12. Two fitting holes 12c for fixing the assembly 21 with, for example, screws 17 are formed in each vertical wall portion 12b. The inner circumferential surfaces of the fitting holes 12c are threaded so as to correspond to the screws 17.

An interaction member 13 is fixed to the side-wall portions 14 and 14 so as to connect them.

Figure 4:
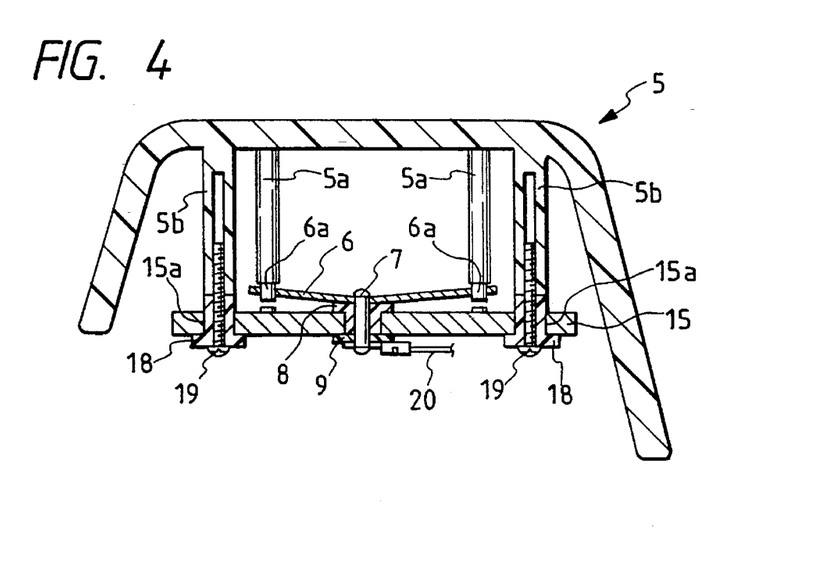
FIG. 4 is a sectional view taken along line IV—IV in FIG. 1.

A horn spring 6 is fixed to each upper wall portion 15 with a rivet 7 through insulating spacers 8 and 9 as shown in FIGS. 3 and 4. In addition, an insertion hole 15a for holding the pad 5 is formed in each upper wall portion 15.

A lead wire 20 connected to the positive side of a horn driving circuit is connected to the rivet 7 so that the horn spring 6 is electrically connected to the positive side. On the other hand, the base portion 11 is attached to the step portions 2b and 2b so that the upper wall portion 15 is electrically connected to the negative side of the horn driving circuit through the boss portion core metal portion 2.

The pad 5 has projections 5a which press contact portions 6a located at the opposite ends of the horn spring 6 (as shown in FIG. 4). When the contact portions 6a are pressed, they contact the upper wall portion 15 so as to actuate the horn. Flanged spacers 18 inserted into the insertion holes 15a from the lower side thereof are fixed to the projections 5b by screws 19 so that the pad 5 is fixed to the respective upper wall portions 15.

The three energy absorbing members 22 forming the assembly 21 are integrally formed from a plastically deformable sheet metal or hard synthetic resin. The energy absorbing members 22 are disposed radially around the interaction member 13 in the base portion 11. In this embodiment, for example, the assembly 21 is formed of polypropylene.

Each of the energy absorbing members 22 includes an approximately ⅙ arc contact portion 23 disposed on the interaction member 13 side which can contact the interaction member 13, an approximately ⅙ arc ceiling portion 24 disposed on the radially outside of the interaction portion 13 which receives an impact force, and a shrinkable or collapsible portion 25 disposed between the contact portion 23 and the ceiling portion 24 plastically deformable and shrinkable in the radial direction of the interaction member 13. The shrinkable portion 25 of the embodiment is made into a rhombic cylinder having an axial direction parallel with the interaction member 13, as an example of a polygonal pillar.

The respective ceiling portions 24 of adjacent energy absorbing members 22 are coupled with a thin breaking-preset portion 26 which can be broken so as to separate the ceiling portions. Further, in the case of this embodiment, the contact portions 23 of adjacent energy absorbing members 22 are also coupled with each other with a thin breaking-preset portion 27 which can be broken so as to separate the contact portions.

Fitting pieces 29 are disposed in the opposite lower portions of the ceiling portions 24 of the lower two energy absorbing members 22 through thin breaking-preset portions 28. Two fitting holes 29a are formed in each of these fitting pieces 29. These fitting holes 29a are provided to fix the assembly 21 to the vertical wall portions 12b in the base portion 11, using screws 17.

Next, the installation of this steering wheel W1 will be described. First, the fitting holes 29a are aligned with the fitting holes 12c of the vertical wall portions 12b, and the assembly 21 is attached thereto using the screws 17.

Next, flanged spacers 18 are inserted from the lower side into the insertion holes 15a of the upper wall portions 15. The projections 5b are then made to correspond to the flanged spacers 18. The screws 19 are screwed into the projections 5b from the lower side thereof so that the pad 5 is attached to the base portion 11.

After that, the bottom wall portion 12 is put on the upper surfaces of the step portions 2b and 2b of the boss plate portion 2a, and screws 16 are fitted into the fitting holes 12a from the lower side so that the steering wheel W1 is installed.

Figure 5:
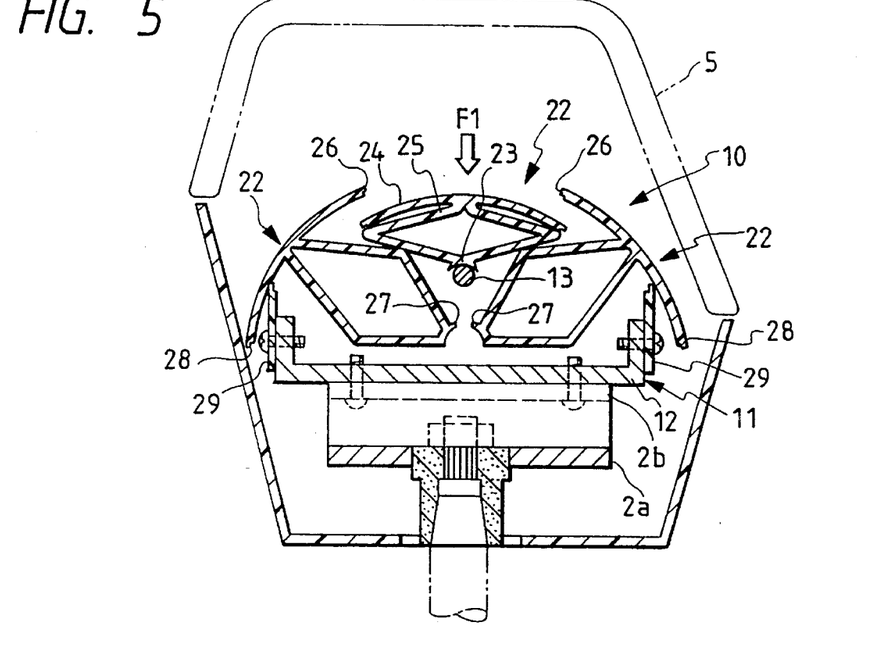
FIG. 5 is a sectional view illustrating a state of operation of first embodiment.
Figure 6:
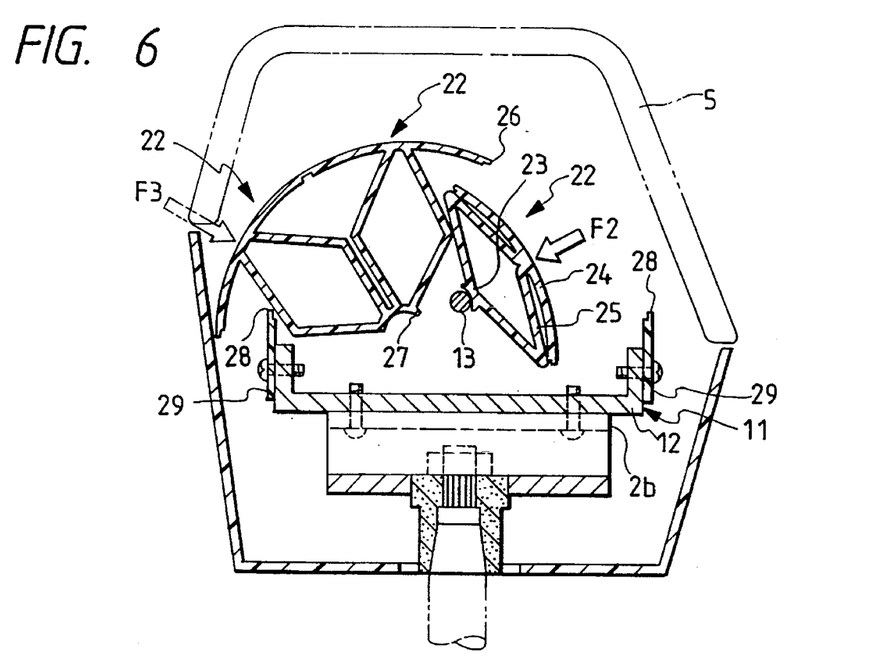
FIG. 6 is a sectional view illustrating another state of operation of the first embodiment.

As shown in FIGS. 5 and 6, when an impact force F1, F2 or F3 (indicated by two-dotted-chain line in FIG. 6) acts on steering wheel W1, an energy absorbing member 22 corresponding to the angle of the acting impact force F1, F2 or F3 first receives the impact force at its ceiling portion 24. The ceiling portion 24 or the contact portion 23 of the energy absorbing member 22 breaks the breaking-preset portions 26, 27 and 28 coupled with the ceiling portion 24, the contact portion 23 and the fitting piece 30 of the adjacent energy absorbing member 22, so that energy absorbing member 22 collapses toward the interaction member 13. The contact portion 23 is pushed by the interaction member 13 so as to make the shrinkable portion 25 shrink as if broken to thereby absorb the energy of the impact force F1, F2 or F3. When the impact force F3 acts, the energy absorbing member 22 corresponding to impact force F3 is deformed in a condition symmetrical with the state of FIG. 6 with the interaction member 13 as a center of symmetry.

Therefore, one of the energy absorbing members 22 corresponding to the incident angle of the impact force F1, F2 or F3 is separated from the adjacent energy absorbing member(s) 22 to thereby absorb, by itself, the impact force F1, F2 or F3. Accordingly, if the energy absorbing members 22 are suitably arranged radially around the interaction member 13, it is possible to handle an impact force by the quantity of energy absorption which can plastically deform only one energy absorbing member 22 even if the acting angle of the impact force varies (F1, F2 or F3). Accordingly, it is possible to make the quantity of energy absorption constant so that it is possible to improve the degrees of freedom of the disposition.

In addition, in the impact energy absorber 10 of the first embodiment, the ceiling portions 24 of the respective energy absorbing members 22 disposed about the interaction member 13 are coupled with each other by the breaking-preset portions 26. Accordingly, arrangement of the respective energy absorbing members 22 around the interaction member 13 can be performed in only one positioning step, making it is possible to perform installation easily.

In this embodiment, the contact portions 23 of the respective energy absorbing members 22 are coupled to each other by the breaking-preset portions 27. The respective absorbing members 22 are therefore integrated as the assembly 21. Accordingly, it is easier to perform positioning of the respective absorbing members 22.

Incidentally, if the above-mentioned benefit is not required, the respective energy absorbing members 22 are not necessarily formed into an assembly 21. Instead, they may be supported separately by the base portion 11 or the steering wheel core metal portions 2 and 3.

Figure 7:
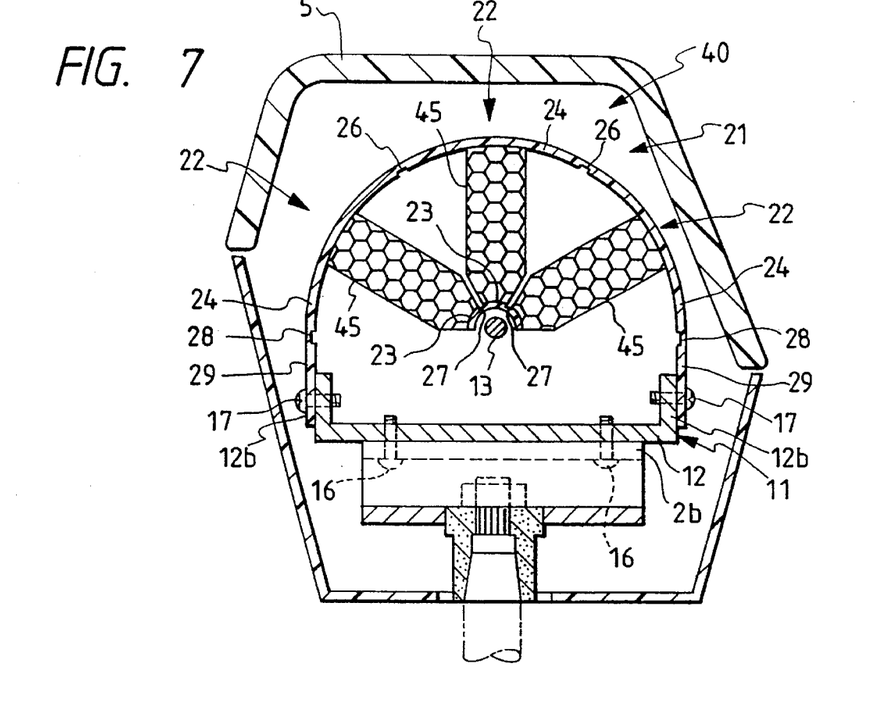
FIG. 7 is a sectional view illustrating a second embodiment of the present invention.
Figure 8:
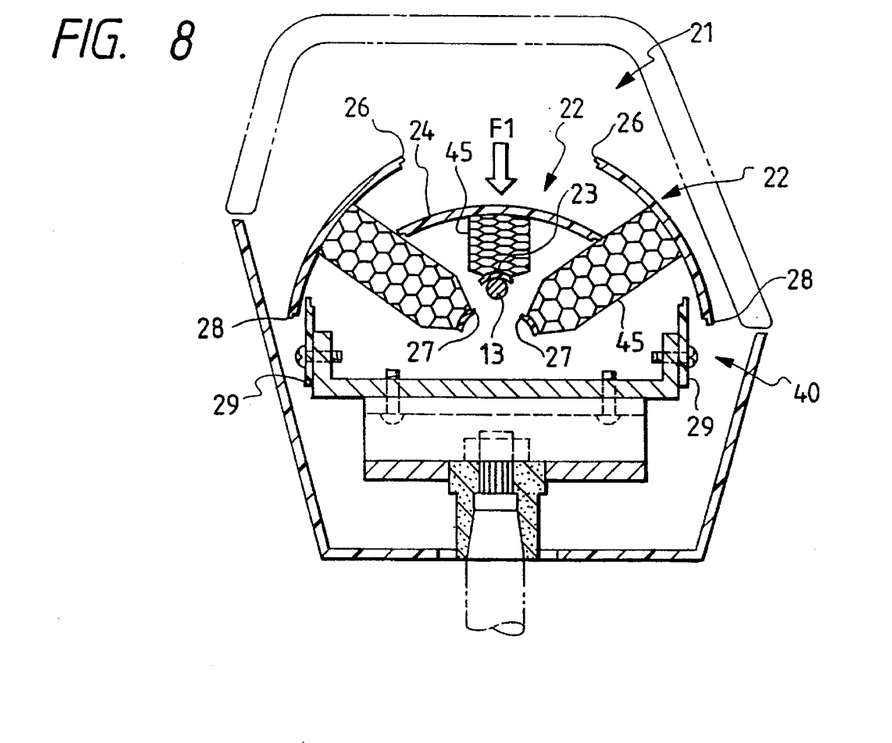
FIG. 8 is a sectional view when the second embodiment is operated.

Although the shrinkable portions 25 of the energy absorbing member 22 form a single cylindrical body in the impact energy absorber 10 of the first embodiment, shrinkable portions 25 can be replaced with honey-comb shrinkable portions 45, each comprising a number of hexagonal pillars extending parallel with the axial direction of the interaction member 13, as shown in FIGS. 7 and 8.

Figure 9:
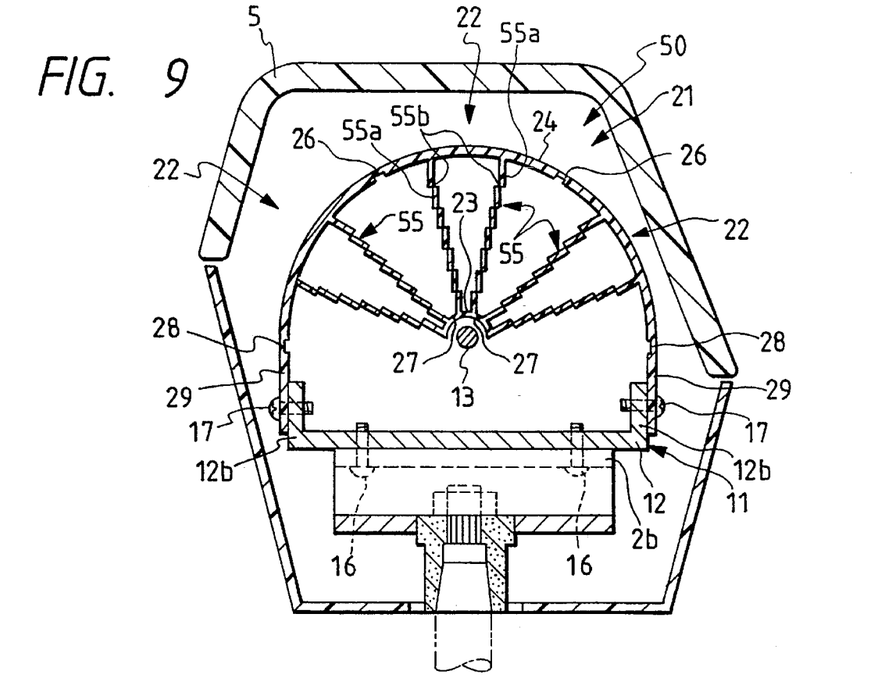
FIG. 9 is a sectional view illustrating a third embodiment of the present invention.
Figure 10:
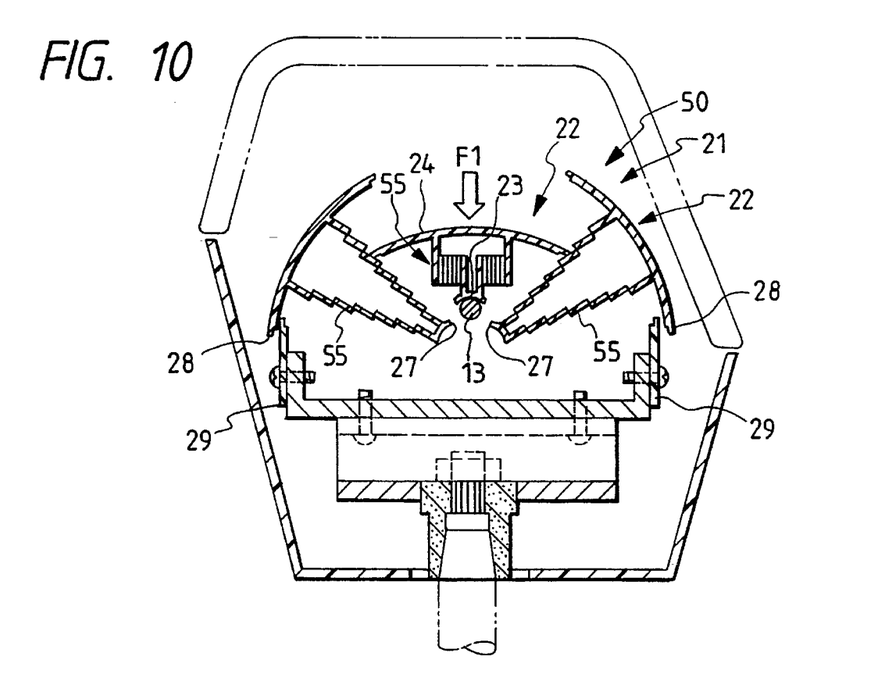
FIG. 10 is a sectional view when the third embodiment is operated.

Further, as shown in FIGS. 9 and 10, shrinkable portions 55 may be formed of tongue pieces 55a shifted in the circumferential direction of the interaction member 13 and coupled with each other sequentially in the radial direction of the interaction member 13. These tongue pieces 55a are coupled with each other through overlap portions 55b which are reduced in strength so as to be breakable.

In the impact energy absorbers 40 and 50 according to these second and third embodiments, the shrinkable portion 45 and 55 does not expand outward during collapse but shrinks in the radial direction of the interaction member 13 as shown in FIG. 8 and 10. Accordingly, the shrinkable portions 45 and 55 do not interact with each other, and the energy of an impact force can be absorbed with a small space.

Figure 11:
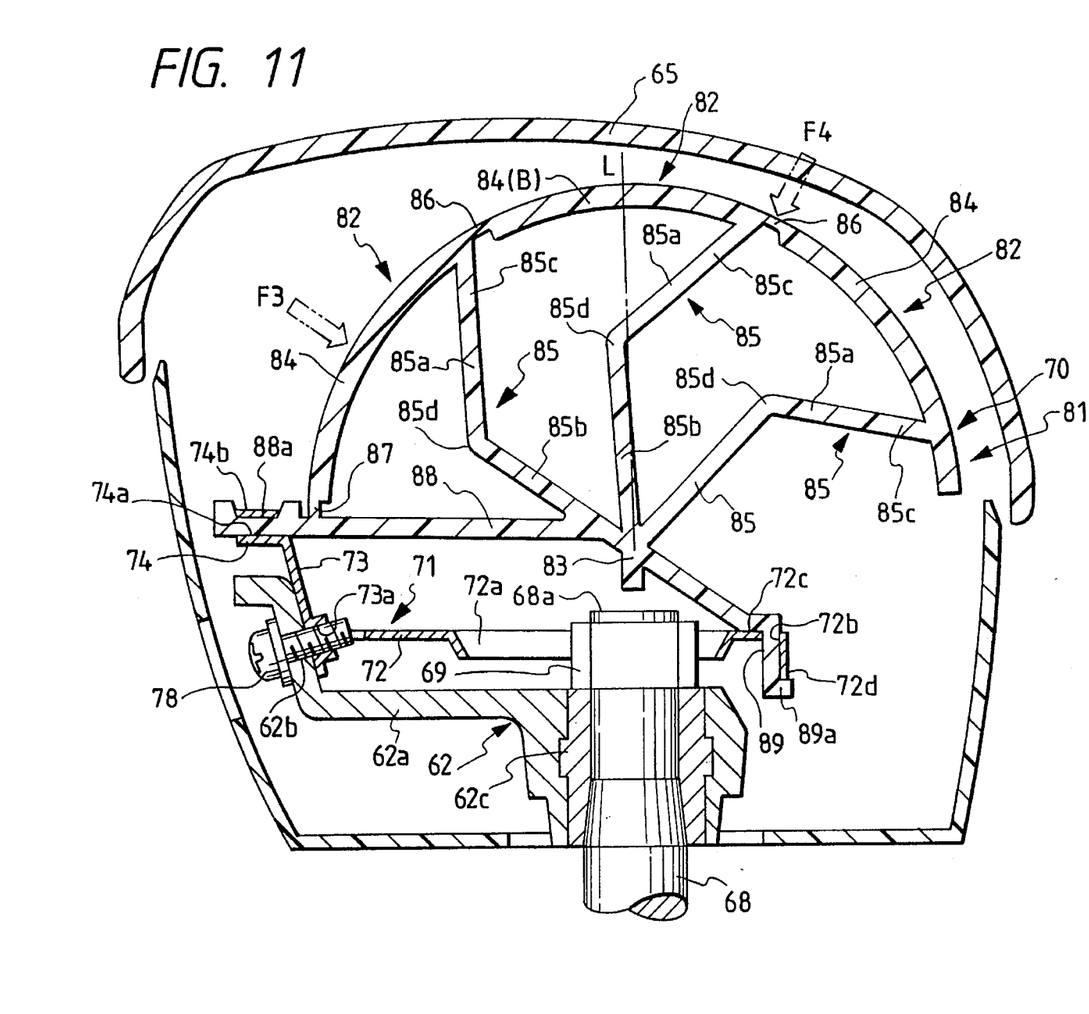
FIG. 11 is a sectional view of a steering wheel to which a fourth embodiment of the present invention is applied, illustrating the portion taken along line XI—XI in FIG. 12.
Figure 12:
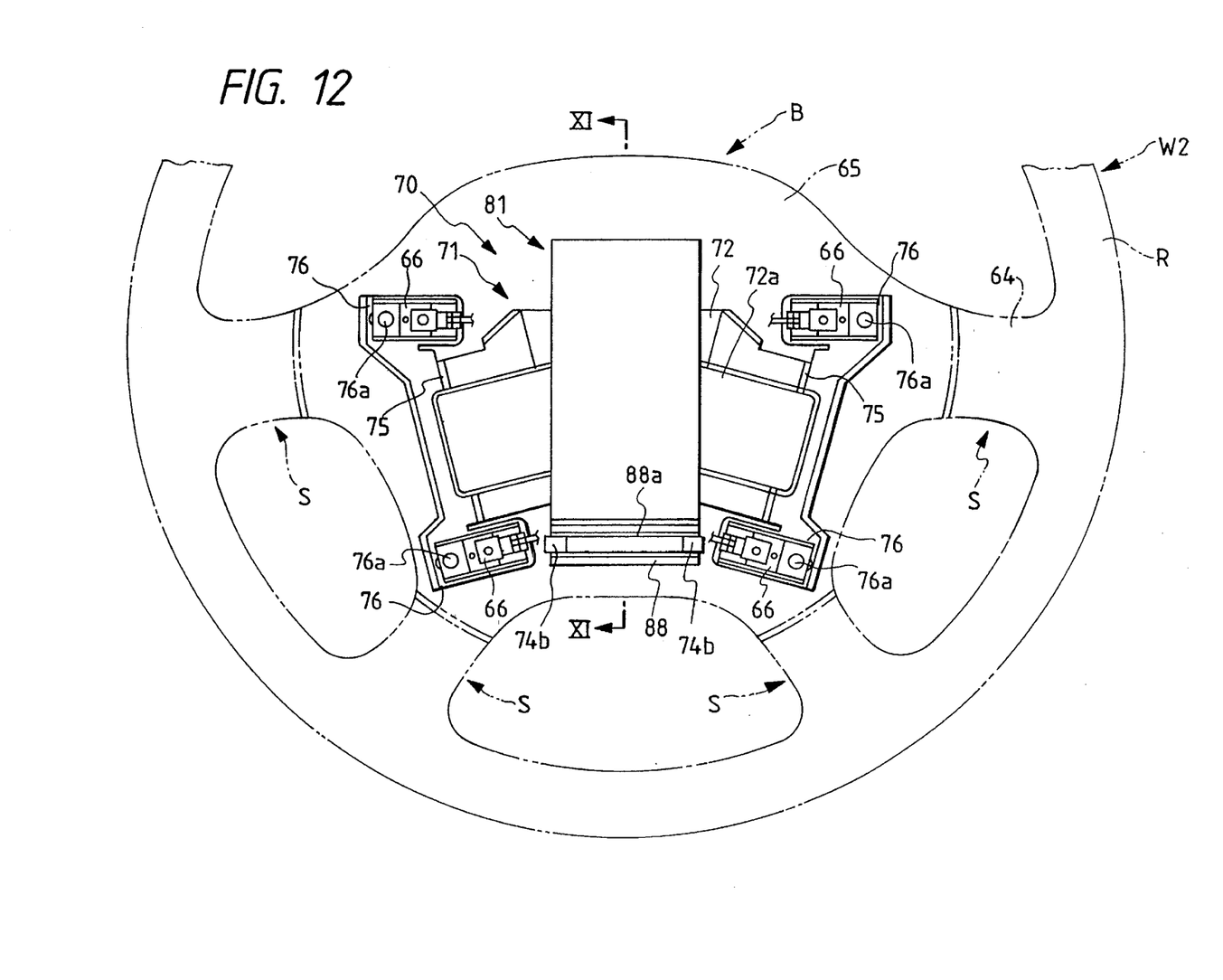
FIG. 12 is a plan view of the steering wheel to which the fourth embodiment is applied.

Preventing shrinkable portions from interacting with each other may be achieved by such a design as an impact energy absorber 70 of a fourth embodiment, as shown in FIGS. 11 and 12. Unlike in the first, second and third embodiments where the interaction member 13 is disposed on the impact energy absorber 10, 40 and 50 itself, an interaction member 68 is disposed on the same portion on which an impact energy absorber 70 is disposed. Like this, the interaction member is not always required to be provided on an impact energy absorber itself.

The impact energy absorber 70 of the fourth embodiment includes a support member 71 and an assembly 81 in which, for example, three energy absorbing members 82 are integrated. A steering shaft 68 on which a steering wheel W2 is mounted is used as the interaction member.

The support member 71 is formed by pressing sheet metal so as to form a bottom wall portion 72, a fitting piece portion 73 extended obliquely and vertically from an edge of the bottom wall portion 72, a support piece portion 74 extending from the upper end of the fitting piece portion 73, foot portions 75 extending upwardly from opposing edges of the bottom wall portion 72, and pedestal portions 76 formed at the opposing portions of the upper ends of the respective foot portions 75.

In the center of bottom wall portion 72, an insertion hole 72a is provided through which a top end portion of a steering shaft 68 projects. An insertion hole 72b penetrating the bottom wall portion 72 vertically is formed near the front edge thereof. In addition, an engagement piece 72d is formed so as to extend down from the front edge of the insertion hole 72b. The portion near the rear edge of the insertion hole 72b near the front edge of the bottom wall portion 72 is a support surface 72c for the assembly 81.

A threaded fitting hole 73a by burring is provided in the fitting piece portion 73 at its lower portion. A screw 78 inserted through a fitting hole 62a in boss plate portion 62a is screwed down into this fitting hole 73a. The impact energy absorber 70 is thereby attached to the steering wheel W2.

The upper surface of the support piece portion 74 includes a support surface 74a for the assembly 81. The right and left edges of the support surface 74a are caulking portions 74b which are caulked so as to fix the assembly 81.

The pedestal portions 76 provided in the front, rear, right and left portions have horn switch bodies 66 fixed thereon. When the support member 71 is fixed with screw 78, the pedestal portions 76 are contacted and supported by the respective upper surfaces of elongated portions of coating layers 64. Coating layers 64 are applied on core metal portions of respective spoke portions S of the steering wheel W2 in the portion covered by horn pad 65. The respective pedestal portions 76 engage the horn pad 65 via engagement holes 76a.

The assembly 81 is formed of an integrated body formed of polypropylene. Three energy absorbing members 82 are disposed about an upper end surface 68a of the steering shaft 68 functioning as an interaction member.

When an impact force acts on this embodiment, the assembly 81 is bent, thereby plastically deforming shrinkable portion 85 of a corresponding one of the energy absorbing members 82. The respective absorbing members 82 are therefore disposed radially around a position which is shifted slightly upward from the upper end surface 68a of the steering shaft 68.

Each energy absorbing member 82 includes a contact portion 83 disposed on interaction member side so as to contact the interaction member 68, an about ⅙ arc ceiling portion 84 disposed so as to receive an impact force, and a shrinkable or collapsible portion 85 disposed between the contact portion 83 and the ceiling portion 84 and being plastically deformable in the radial direction about the upper end surface 68a of the interaction member 68.

Each shrinkable portions 85 includes a bend portion 85a which is substantially L-shaped in section. The bent portion 85a includes first plate-like arm portion 85b disposed on the interaction member 68 side, a second plate-like arm portion 85c disposed so as to continue to the first arm portions 85b through a bent portions 85d away from the interaction member 68. The bent portions 85d of the respective shrinkable portions 85 are oriented in the same direction around the upper end surface 68a of the interaction member 68. The end portions of the respective first arm portions 85b near the interaction member 68 intersect and are coupled through a support plate portion 88. A single contact portion 83 projects down, common to the respective energy absorbing members 82. The outer distal ends of the respective second arm portions 85c are connected to the front ends of the respective ceiling portions 84. Each of the bent portions 85d is disposed so as to slightly project toward the rear side almost orthogonally at the center of the ceiling portion 84.

The respective ceiling portions 84 are coupled to each other through thin breaking-preset portions or fracture grooves 86, and the ceiling portion 84 on the rearmost side is coupled to the support plate portion 88 with thin breaking-preset portion 87.

The support plate portion 88 is formed so that the lower side of the contact portion 83 is substantially perpendicular to the axial direction of the steering shaft 68 so as to be supported by the support surface 74a of the support member 71. Meanwhile, the caulking portion 74b is fitted into a groove 88a formed at the rear end of the support plate portion 88 so that the support plate portion 88 is coupled with the support member 71. The support plate portion 88 extends obliquely downward and at a portion on the rear side than the contact portion 83. A locking plate portion 89 extends down at the front end of the support plate portion 88. The locking plate portion 89 has a hook portion 89a at its lower end. The locking plate portion 89 is inserted into the insertion hole 72b of the support member bottom wall portion 72. The hook portion 89a engages the lower end of the locking piece 72d so that the locking plate portion 89 is coupled to the support member 71.

The rear end of the support plate portion 88 is caulked by the caulking portion 74b. The locking plate portion 89 engages the locking piece 74d so that the assembly 81 is fixedly attached to the support member 71 an is supported by the support surface 72c and 74a.

The installation of steering wheel W2 will now be described. The horn switch bodies 66, the assembly 81 and the pad 65 are attached to support member 71. The impact energy absorber 70 is attached to the steering wheel W2 by the screw 78, together with the pad 65. Practically, when the impact energy absorber 70 is fixed to the steering wheel W2 by the screw 78, the steering shaft 68 is already fixed to the boss 62c of the core metal portion 62 by a nut 69.

Figure 13:
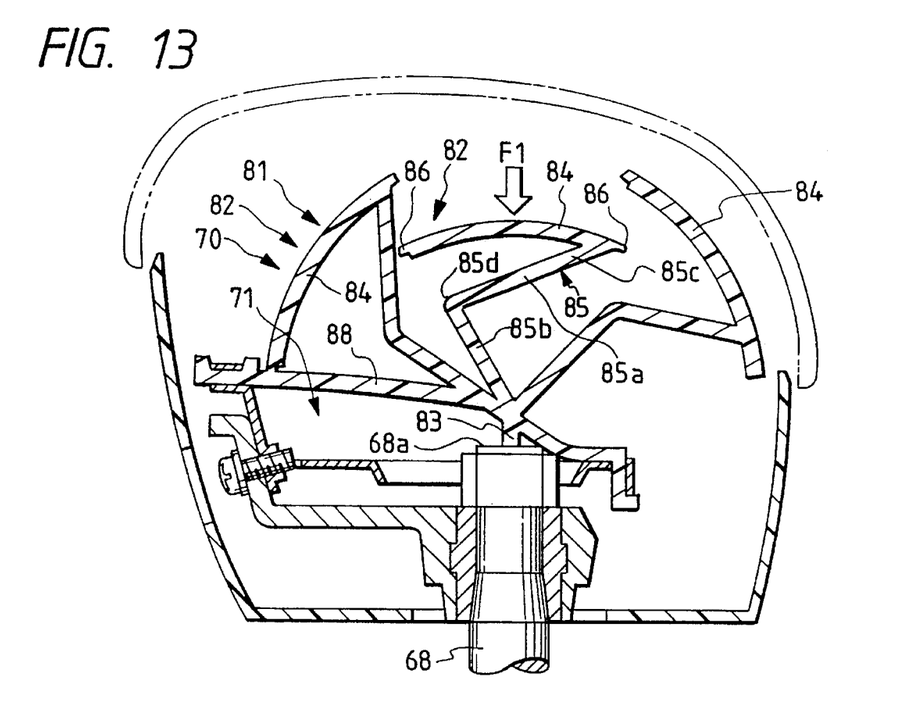
FIG. 13 is a sectional view illustrating a state of operation of the fourth embodiment.
Figure 14:
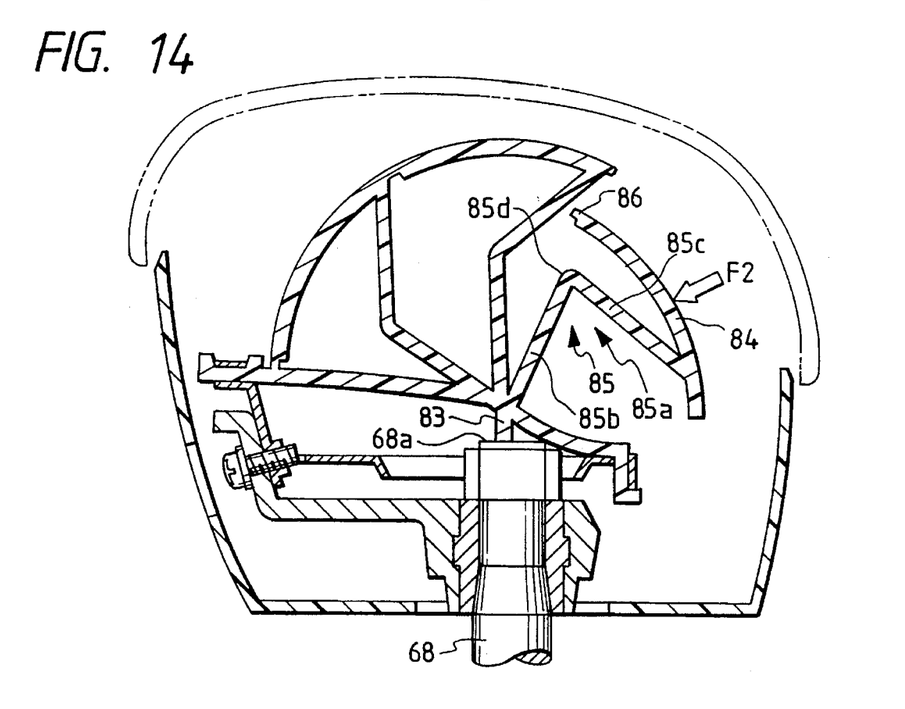
FIG. 14 is a sectional view illustrating another state of operation of the fourth embodiment.

In this steering wheel W2, as shown in FIGS. 13 and 14, when an impact force F1, F2 or F3 (indicated by two-dotted-chain line in FIG. 11) acts, one of the energy absorbing members 82 corresponding to the incident angle of the impact force F1, F2 or F3 receives the impact force at its ceiling portion 84. The breaking-preset portions 86 and 87 coupled with the ceiling portions 84 of the adjacent energy absorbing member 82 and the support plate portion 88 are therefor broken. At the same time, the support plate portion 88 is bent so that the contact portion 83 contacts with the upper end surface 68a of the steering shaft 68 acting as an interaction member.

Next, the bent portion 85d in the energy absorbing member 82 corresponding to the angle of the acting impact force is further bent until it breaks. Consequently, the energy of the impact force is absorbed so that an effect similar to that of the first embodiment can be obtained.

In this fourth embodiment, the bent portion 85d of the bent piece 85a is bent until it breaks when an impact force thereon acts. However, since the bent piece 85*a* is disposed in the same direction as the direction of the adjacent bent piece 85*a*, the bent portion 85*d* which is bent further bent protrudes into the concave side of the adjacent bent portion 85*d*. Accordingly, it is possible to prevent the shrinkable portions 85 from interacting or obstructing each other, making it possible to restrain the value of load from increasing when the impact force energy is absorbed. In order to obtain such an effect, the bent pieces 85*a* need not always be L-shaped in section as shown in this embodiment. They may, for example, be C-shaped in section.

Further, in the fourth embodiment, the bent pieces 85*a*, which act as the shrinkable portions 85 of the respective energy absorbing members 82, are disposed on the end portions of the ceiling portions 84, (i.e., near the breaking-preset portions 86). Therefore, one ceiling portion 84B deforms and breaks the breaking-preset portions 86 on opposite sides thereof. One bent piece 85*a* is deformed in the case where an impact force F1 acts on the center of the ceiling portion 84B. The bent piece 85*a* is, however, somewhat difficult to deform because the bent piece 85*a* is coupled with an end portion of the ceiling portion 84B. That is, the value of deformation load is large in the ceiling portion 84B, while small in the bent piece 85*a*. On the other hand, if an impact force F4 (indicated by two-dotted-chain line in FIG. 11) acts on the breaking-preset portion 86 on the end of the ceiling portion 84B, one breaking-preset portion 86 breaks so that the bent piece 85*a* near the breaking-preset portion 86 deforms smoothly. That is, the value of deformation load is small in the ceiling portion 84B, while large in the bent piece 85*a*. Accordingly, even if the position where the impact force F1 or F4 acts on the ceiling portion 84B varies, the values of deformation load in the ceiling portion 84B and the bent piece 85*a* are inversely proportional to each other so that it is possible to make the sum of the values of deformation load in the ceiling portion 84B and the bent piece 85*a* approximately constant.

In this fourth embodiment, therefore, even if the position where an impact force acts on the ceiling portion 84 of each energy absorbing member 82, it is possible to make the value of deformation load uniform, and it is possible to make the quantity of energy absorption constant, so that it is possible to further improve the degrees of freedom of the disposition for the impact energy absorber 70.

When the shrinkable portions 25 of the respective absorbing members 22 are disposed at the centers of the respective ceiling portions 24 as shown in the first embodiment, one ceiling portion 24B bends, breaking the breaking-preset portions 26 on the opposite sides thereof. Also, one shrinkable portion 25B shrinks when an impact force F1 acts on the center of the ceiling portion 24B. On the other hand, if an impact force F4 (indicated by two-dotted-chain line in FIG. 2) acts on the breaking-preset portion 26 formed at the end portion of the ceiling portion 24B, only one breaking-preset portion 26 breaks, thereby bending the tops of ceiling portions 24A and 24B on the opposite sides thereof. It is therefore difficult to deform shrinkable portions 25A and 25B on the opposite sides thereof. Accordingly, the value of deformation load of the impact energy absorber 10 is large when the impact force F1 acts on the center of the ceiling portion 24B, while the value of deformation load of the impact energy absorber 10 is small when the impact force F4 acts on the breaking-preset portion 26 on the end portion of ceiling portion 24B. Accordingly, if positions where an impact force acts on the ceiling portions 24 of the individual energy absorbing members 22 varies, some variance is caused in the value of deformation load.

Also in the respective first, second and third embodiments, therefore, the respective shrinkable portions 25, 45 and 55 may be connected to the end portion sides of ceiling portions 24.

Although the energy absorbing members 22 are hollow and made from a plastically deformable sheet metal or hard synthetic resin in the first, second and third embodiments, the energy absorbing members may be made from foamed bodies such as plastically deformable hard urethane foam, or the like.

Although the three energy absorbing members 22 and 82 are disposed radially around the interaction member 13 and 68 in the respective first, second, third and fourth embodiments, it is possible that the depth of the assemblies 21 and 81 (the dimension in the right and left directions of the steering wheel W1 and W2) is short. A plurality of such assemblies are therefore disposed in series in the axial direction of the interaction member 13 and 68, while the angle with which the energy absorbing 22 and 82 are disposed radially around the interaction member 13 and 68 is shifted between the respective assemblies adjacent to each other.

Although the impact energy absorber 10, 40, 50 or 70 is disposed on a steering wheel in the respective first, second, third and fourth embodiments, such an impact energy absorber according to the present invention may be provided on an instrument panel, a door, a seat back or the like in a vehicle.

What is claimed is:

1. An energy absorber comprising:

an elongate interaction member having an axis therealong; and a plurality of elongate energy absorbing members provided about said interaction member and extending substantially parallel to said interaction member, each said energy absorbing member comprising:

a contact portion provided on a first radially proximal side of said energy absorbing member adjacent to said interaction member;

a ceiling portion provided on a second radially distal side of said energy absorbing member opposite said first radially proximal side of said energy absorbing member; and at least one collapsible portion connected to and extending between said contact portion and said ceiling portion.

2. An energy absorber according to claim 1, wherein said at least one collapsible portion is a hollow pillar having a polygonal cross-section and extending substantially parallel to said interaction member.

3. An energy absorber according to claim 1, wherein said at least one collapsible portion is a pillar comprising a plurality of honeycomb sections, each honeycomb section having a polygonal cross-section and extending substantially parallel to said interaction member.

4. An energy absorber according to claim 1, wherein said at least one collapsible portion comprises a wall portion including a plurality of slidingly overlappable elongate segments extending substantially parallel to said interaction member.

5. An energy absorber according to claim 1, wherein said at least one collapsible portion is a wall portion extending substantially parallel to said interaction member and including a bent portion which is substantially parallel to said interaction member.

6. An energy absorber according to claim 5, wherein each said at least one collapsible portion of said plurality of energy absorbing members is bent in the same direction.

7. An energy absorber according to claim 1, wherein said ceiling portions of said plurality of energy absorbing members are coupled to each other along respective breakable portions which are constructed and arranged so as to break under the effect of an applied impact force, thereby separating adjacent ceiling portions.

8. An energy absorber according to claim 1, wherein said at least one collapsible portion is connected to a center portion of said ceiling portion with respect to a circumferential direction along said ceiling portion.

9. An energy absorber according to claim 1, wherein said at least one collapsible portion is connected adjacent to an axial edge portion of said ceiling portion.

10. In a vehicle steering wheel assembly including a central base portion, an energy absorber comprising:

an elongate interaction member having an axis thereialong; and a plurality of elongate energy absorbing members provided about said interaction member and extending substantially parallel to said interaction member, each said energy absorbing member comprising:

a contact portion provided on a first radially proximal side of said energy absorbing member adjacent to said interaction member;

a ceiling portion provided on a second radially distal side of said energy absorbing member opposite said first radially proximal side of said energy absorbing member, wherein said ceiling portions of said plurality of energy absorbing members are coupled to each other along respective breakable portions which are constructed and arranged so as to break under the effect of an applied impact force, thereby separating adjacent ceiling portions; and at least one collapsible portion connected to and extending between said contact portion and said ceiling portion, wherein said ceiling portions of said plurality of energy absorbing members are coupled to each other along respective breakable portions, wherein axial edges of circumferentially first and last ceiling portions of said plurality of energy absorbing members are also coupled by breakable portions extending substantially parallel to said interaction member to the base portion, said breakable portions being constructed and arranged so as to break under the effect of an applied impact force.

* * * * *